United States Patent [19]

Temple

[11] 4,248,935
[45] Feb. 3, 1981

[54] STORAGE STABLE POLYOLEFIN COMPATIBLE NON-CROSSLINKING SIZE FOR FIBER GLASS STRANDS

[75] Inventor: Chester S. Temple, McKees Rocks, Pa.

[73] Assignee: PPG Industries, Inc., Pittsburgh, Pa.

[21] Appl. No.: 932,275

[22] Filed: Aug. 21, 1978

[51] Int. Cl.$^3$ ............... B32B 27/00; D02G 3/00
[52] U.S. Cl. ................... 428/391; 428/288; 428/392; 428/441; 428/500
[58] Field of Search ............. 428/392, 391, 375, 378, 428/288, 441; 65/3 C; 242/159; 206/389; 260/42.15, 42.18, 42.46; 425/429, 500, 516, 430, 520, 442

[56] References Cited

U.S. PATENT DOCUMENTS

| | | | |
|---|---|---|---|
| 2,563,288 | 8/1951 | Steinman | 428/391 |
| 2,674,619 | 4/1954 | Lundsted | 260/29.6 ME |
| 2,993,872 | 7/1961 | Gagnon | 260/8 |
| 3,013,915 | 12/1961 | Morgan | 428/251 |
| 3,090,701 | 5/1963 | Shulver et al. | 428/392 |
| 3,143,405 | 8/1964 | Wong | 65/3 |
| 3,284,179 | 11/1966 | Eilerman | 65/3 C |
| 3,418,094 | 12/1968 | Marsden et al. | 65/3 C X |
| 3,437,550 | 4/1969 | Paul, Jr. | 428/251 |
| 3,444,120 | 5/1969 | Boyes et al. | 260/29.6 NR |
| 3,597,265 | 8/1971 | Mecklenborg et al. | 260/18 N X |
| 3,630,827 | 12/1971 | Hartlein | 428/391 |
| 3,655,353 | 4/1972 | Nalley et al. | 65/3 C |
| 3,661,628 | 5/1972 | Marsden | 428/391 X |
| 3,664,909 | 5/1972 | Ackley | 428/293 |
| 3,772,870 | 11/1973 | Wong et al. | 428/392 X |
| 3,849,148 | 11/1974 | Temple | 65/3 C |
| 3,882,068 | 5/1975 | Swartz | 260/29.6 H |
| 3,883,333 | 5/1975 | Ackley | 65/2 |
| 3,920,526 | 11/1975 | Furukawa et al. | 260/22 R |
| 3,920,596 | 11/1975 | Furukawa et al. | 260/22 R |
| 3,924,047 | 12/1975 | Ward, Jr. et al. | 428/378 |
| 3,928,687 | 12/1975 | Wada et al. | 428/392 X |
| 3,936,415 | 2/1976 | Coakley | 428/391 |
| 3,936,415 | 2/1976 | Coakley | 428/378 X |
| 3,997,306 | 12/1976 | Hedden | 65/3 C |

FOREIGN PATENT DOCUMENTS

| | | |
|---|---|---|
| 1046870 | 1/1979 | Canada . |
| 919318 | 2/1963 | United Kingdom . |
| 1025913 | 3/1964 | United Kingdom . |
| 1083729 | 9/1967 | United Kingdom . |
| 1136548 | 12/1968 | United Kingdom . |
| 1347186 | 2/1974 | United Kingdom . |
| 1359557 | 7/1974 | United Kingdom . |
| 1359558 | 7/1974 | United Kingdom . |

*Primary Examiner*—Lorraine T. Kendell
*Attorney, Agent, or Firm*—Kenneth J. Stachel; Paul A. Leipold

[57] ABSTRACT

Continuous glass fiber with a polyolefin compatible sizing composed of a coupling agent, a stabilizer, a lubricant, a non-crosslinking film forming polymer, softening agent and surfactant are disclosed for utilization in polyolefin polymer reinforcement. The article formed and formation method for fiber combination with a polyolefin polymer are also disclosed.

17 Claims, No Drawings

STORAGE STABLE POLYOLEFIN COMPATIBLE NON-CROSSLINKING SIZE FOR FIBER GLASS STRANDS

BACKGROUND OF THE INVENTION

1. Field of the Invention

The present invention relates to glass fiber strand treatment and particularly relates to treating glass fibers during or after forming with an aqueous sizing which prepares the glass fibers for bonding to polyolefins in the reinforcement of polyolefin materials and further has long shelf life and can be used from forming packages formed immediately into mat.

2. Description of the Prior Art

It is known that glass fibers in the form of continuous strands, chopped strands or mats can be used successfully to reinforce polyolefins. And it is known that without effective coupling between the glass and the polyolefin, the adhesion between the two will be weak and separation will occur under shear or tensile stresses. It is further known that the affinity of glass for water aggravates bond weakness when glass is inadequately bonded to polyolefins.

A workable method has been disclosed which permits bonding glass to "lower" polyolefins which are essentially crystalline plastics formed from monomers having three or more carbon atoms. As disclosed in U.S. Pat. No. 3,013,915 at column 2, lines 38-46, glass bonding to polyolefins may be improved by "cleaning the glass surface, applying a coupling agent to it, treating with a chemical agent which is a source of dehydrogenating or oxidizing radicals, contacting the polyolefin with the glass, and fusing it by heating the polyolefin above its melting point to complete the interbonding." At column 4, lines 16-19, the disclosure reveals a preference for radical sources having low decomposition points below 180° F. and at column 4, lines 69-71, indicates that exposure to heat must be avoided.

U.S. Pat. No. 3,849,148 proposes the method of sizing fiber glass strands with an aqueous sizing containing a coupling agent, a heat stable organic peroxide, a nonionic surfactant and a lubricant. This process was successful in giving some storage capability to the sized strands but did not result in long storage life and further remains susceptible to degradation by high storage temperatures.

U.S. Pat. No. 3,882,068 discloses the sizing composition for glass fibers in several plastic resin systems wherein the size comprises a coupling agent and a polyolefin emulsion.

U.S. Pat. No. 3,437,550 discloses a method of increasing the bonding of glass fibers to polyolefins by treating the fiber with a crystalline polypropylene matrix polymer. The preferred modifiers disclosed are maleic anhydride and acrylic acid.

U.S. Pat. No. 3,883,333 discloses a method and apparatus for forming a continuous glass fiber mat or sized fibers that are suitable for bonding with polyolefins. The process and apparatus disclosed allows lay down of the fibers to form a mat immediately after formation of sized strands.

While the above processes and compositions were useful, there remains a need in the art for a sizing to promote the binding of polyolefins to continuous glass fiber strands with increased adhesion. Further, there remains a need for a sizing for glass fiber strands which will allow the formation of the sized fiber into forming packages or mat that may be stored indefinitely prior to use. Effective sizings containing peroxides have limited shelf-life since they are very sensitive to elevated temperature variations during drying of the fibers and high temperatures during storage which can cause premature degradation of the peroxides thus reducing the effectiveness of the sizing in binding the glass fiber strands to the polypropylene matrix. A problem in forming the fiber mat with continuous lay down after strand formation is that the sizing materials readily cross-link and form deposits on the sizing applicator equipment. These deposits cause delays in production and defects in the mat that is being formed. Therefore there is a continuing need for an improved sizing for continuous lay down mat formation.

SUMMARY OF THE INVENTION

It is an object of this invention to overcome the disadvantages of the prior processes and compositions.

It is an additional object to provide an improved sizing for continuous formation of a storage stable mat that will bind with polyolefins.

It is further object of this invention to provide a storage stable polyolefin bonding sizing for continuous glass fibers.

It is further object of this invention to provide a storage stable polyolefin bonding sizing for continuous glass fibers.

It is another object of this invention to produce polyolefin glass fiber composites using glass fibers from forming packages.

It is further an additional object to produce storage stable forming packages of glass fiber strands.

It is another object to create a polyolefin bonding sizing not susceptible to thermal degradation during the drying operation.

It is another additional object to form a sizing that does not create deposits on the sizing applicator equipment.

These and other objects of the invention are generally accomplished by applying a sizing comprising a coupling agent, a stabilizer, a lubricant, a non-crosslinkable film-former, a softener, a surfactant and an aqueous carrier to a glass fiber strand. The sized strand is then wound into a forming package and dried for later use as a reinforcement for polypropylene material.

In a preferred embodiment of the invention, an aqueous sizing comprising a coupling agent of gamma-amino-propyltriethoxysilane, a lubricant comprising cis-butenedioic acid, a lubricant of an emulsion of maleonated amorphous polypropylene, a non-crosslinkable film-former of vinyl acetate homopolymer, a softener of polyethylene and a surfactant are supplied in an aqueous sizing to a glass fiber so as to impregnate the strand and improve its ability to reinforce polypropylene articles. The strand is immediately formed into a mat, needled and dried to remove the aqueous carrier. The dried mat is combined with polypropylene sheet and under heat and pressure formed into a fiber reinforced article.

DESCRIPTION OF THE PREFERRED EMBODIMENTS

The utilization of the sizing system of the instant invention results in numerous advantages over the prior processes. The utilization of a storage stable sizing with no shelf-life limitation improves production capability because it allows the storing and distribution of mat or forming packages of sized glass fiber strand. Prior to the instant invention, it was necessary that the sized fiber mat be used shortly after forming or be immediately formed into composite articles. Further, the drying of the sized fiber was difficult as the drying temperature conditions were limited by a necessity to not decompose the peroxide, an important ingredient of the sizing. With utilization of the instant system, it is possible to form mat or forming packages of sized glass fiber strands at a central location. These may be then shipped without limitation as to temperature or atmosphere during shipping to distant points for fabrication into composite polyolefin glass fiber reinforced articles. This offers considerable improvement since the forming of glass strands no longer must be carried out at the same location that the polyolefin glass fiber reinforced article is formed. Thus as can be seen that although the individual ingredients had been used in other sizings, the instant combination of ingredients allows the achievement of numerous advantages not present in prior systems. Another advantage of the instant system is that the sizing contains no cross-linkable material to build up on the applicator devices and therefore is cleaner running. Further as the sizing does not cross-link it has a long pot life.

Any glass suitable for reinforcing and for drawing in fiber form may suitably be treated in accordance with the present invention. Soda-lime glasses and borosilicate ("E") glasses are particularly suited for this practice.

The glass fiber strands to be treated according to this invention may be typically produced according to the teachings of U.S. Pat. No. 2,133,238. The glass fiber strands are composed of a multitude of fine glass filaments which are formed by being drawn at a high rate of speed from molten cones of glass located at the tips of small orifices in a bushing. During formation, the filaments are coated with the aqueous sizing prepared according to the description below. Coating of the filaments takes place while they are moving at a speed of the order of 1,000 to 20,000 feet per minute. The coating is accomplished in the immediate vicinity of the hot bushings and the glass furnace in which the glass is melted, and after coating, the glass fiber strands move a short distance onto a collecting means. After the strands have been sized, they may be dried to drive off residual moisture from the sized glass.

The aqueous sizing to contact and coat the glass fiber strand is composed of a coupling agent, a stabilizer, a softening agent, a surfactant, a lubricant and a non-crosslinkable film former.

The coupling agent may be any interfacial boundary area adhesive compound which acts to unite the surface of the glass fiber strand with the polyolefin polymer. Among typical coupling agents for uniting glass fiber strand and polymers are metal salts of the strong metal acids such as basic chromium chloride, basic chromium sulfide having a trivalent metal ion selected from the group consisting of chromium, cobalt, nickel, copper, and lead having at least one hydroxyl group attached to the metal and at least one anion of a strong mineral acid attached to the metal; Werner type complexes in which a trivalent nuclear atom such as chromium is coordinated with an organic acid such as methacrylic acid, for instance, methacrylic acid complex of chromic chloride, and other Werner type coupling agents, having vinyl, alkyl, amino, epoxy, mercapto, thioalkyl, thioalkyl and phenol groups. Suitable for utilization in the instant invention are coupling agents from the silane and siloxane groups. Typical of such coupling agents are hydrolyzable, vinyl, allyl, beta-chloropropyl, phenyl, thio-alkyl, thio-alkaryl, amino-alkyl, methacrylato, epoxy, and mercapto silanes their hydrolysis products and polymers of hydrolysis products and mixtures of any of these. A preferred coupling agent is gamma-aminopropyltriethoxysilane as this material has been found to provide very good coupling between the glass fiber strand and polyolefin polymers at low concentrations and with good stability.

Any stabilizer may be selected which acts as a secondary coupler to improve the stability of the sizing system, assists in crosslinking, improves the coupling agent to fiber interface and assists the action of the silane in coupling. Typical of stabilizers for sizes suitable for the instant invention are ethylenically unsaturated carboxylic acid or anhydrides. Examples of such difunctional acids and anhydrides include maleic acid, fumaric acid, itaconic acid, citrconic acid, acrylic acid, methacrylic acid, crotonic acid, icocrotonic acid, mesaconic acid, angelic acid, maleic anhydride, itaconic anhydride and citraconic anhydride, and mixtures thereof. A preferred stabilizer is maleic acid (cis-butenedoic acid) that gives a stable system and improves the coupling action of the silane coupling agent.

Any material that acts as a lubricant to aid film forming and assist the coupling may be used as the lubricant of the invention. Suitable lubricants are chemically modified polypropylenes. Maleonated or acrylic modified polypropylenes are preferred as they result in a sized fiber with good storage properties and ability to feed from the forming package.

The polymer which forms the non-crosslinkable film former material of the sizing of the system of the instant invention may be any material that provides strand integrity to aid in the processability of the glass fiber strand allowing strand removal from a forming package. The non-crosslinkable polymer provides the desired level of plasticity to the size such that the sized fiber of the instant system has an extended shelf-life and also the processability to allow successful needling of a mat formed of the sized fibers of the instant invention. The non-crosslinkable polymer generally is a homopolymer, or mixtures of homopolymers, or fully cured polymer that will not crosslink in the conditions of the sizing and molding operations to which the sized fiber is subjected in the drying of the aqueous sizing from the fiber and molding with a olefin homopolymer such as polypropylene. Typical of non-crosslinkable film-forming polymers suitable for the instant invention are epoxies, polyesters, polyurethanes, polyvinyl acetates, polyvinyl alcohols and acrylics. A preferred non-crosslinkable film-forming material is vinyl acetate homo-polymer is vinyl acetate homopolymers are low in cost, do not degrade at the instant forming temperatures, and provide good strand integrity when used on a glass fiber strand.

The sized glass fibers may be formed and the size applied by the known methods of fiber formation and sizing application. Representative of a method of fiber formation and sizing application is the process illustrated in FIG. 2 of U.S. Pat. No. 3,849,148 which is hereby incorporated by reference. Glass fiber filaments emerge from orifices of an electrically heated bushing. These fibers are attenuated and by means of a strand pulling device these filaments are gathered to form a strand of glass fiber which may comprise numerous individual fibers. The sizing is applied to the fibers by a conventional size applicator such as a kiss-roll applicator or a belt applicator device. Detail of a sizing applicator is shown in U.S. Pat. No. 2,728,972. The filaments after exiting the bushing are cooled by air or preferably water. The filaments are gathered into bundles by a gathering shoe and are then led to a strand pulling device such as illustrated in U.S. Pat. No. 3,292,013 as well as in the above referenced, U.S. Pat. No. 3,849,148. The glass fiber strand or strands, if the filaments exiting from the bushing have been separated into several strands, are then wound onto a forming tube on a collet rotating at approximately 7,500 rpm to produce a strand travel of approximately 12,000 to 15,000 feet per minute. The glass fiber strand forming packages are then dried. This generally is accomplished by baking the packages of fiber at a temperature and for a length of time sufficient to remove substantially all of the water. Generally a curing time for the instant size is about 11 hours at 270° F. After drying the forming tube may be removed resulting in a forming package of sized glass fiber. These forming packages may be stored virtually indefinitely when sized with the instant sizing. When the forming package is desired for use in forming a polyolefin composite article, a group of the forming packages are arranged so that the strands may be drawn from the packages and laid down to form a mat of fibers such as disclosed in U.S. Pat. No. 3,883,333 or U.S. Pat. No. 3,664,909. The mat is then needled and combined or impregnated with polyolefin resin or laminated with polyolefin sheets to form reinforced polyolefin articles which are heated at a temperature in the range of 400° F. to about 430° F. at a pressure of about 9250 pounds per square inch for about 5 to about 20 minutes to bind the sized glass fibers of the invention to the polyolefin. The laminated polyolefin glass fiber mat articles may then be stamped or molded by a variety of means, including that of U.S. Pat. No. 3,664,909 hereby incorporated by reference, to produce reinforced polyolefin laminates suitable for use as containers, automobile seats or for other low-cost, high strength and low temperature uses.

The coupling agent may be utilized in amounts which results in good interfacial boundary area adhesion between the glass fiber strand and the polyolefin. A silane coupling agent concentration of about 2 to about 30 percent silane by weight of the solids in the sizing emulsion has been found to be suitable. A preferred percent has been found to be about 5 to about 12 percent of the silane to give maximum adhesion with minimum cost.

A lubricant may be utilized in any amount which results in good stability of the sizing system. A suitable amount of lubricant has been found to be about 10 to about 50 percent by weight of solids in the sizing solution for good forming and fabrication processability.

A stabilizer may be used in any amount which results in good interface bonding of the film-forming materials to the glass fiber strand. A suitable amount has been found to be about 1 to about 15 percent by weight stabilizer to the solids of the sizing emulsion. A preferred amount of stabilizer has been found to be about one-half the amount of the coupling agent to give good adhesion of the film formers to the coupling agent.

The non-crosslinkable-film forming material is utilized in an amount to give the desired handling properties to the sized strand. The non-crosslinkable polymer imparts plasticity to the fiber. The film former acts to provide integrity to the glass fiber strand so that it does not come apart into filaments during processing or cutting operations. A normal range of the non-crosslinkable polymer would be between about 20 and about 60 percent by weight of the solids in the sizing emulsion. A preferred amount of the non-crosslinkable polymer is between about 35 and about 40 percent by weight to give optimum handability.

The softener may be any material that softens the strand, modifies drape, decreases the scroopyness of the fibers and contributes lubricity such that the fibers may be successfully needled in the mat without excess fiber breakage. The preferred softeners are the polyethyleneimine derivatives such as disclosed in U.S. Pat. No. 3,597,265 as they give good drape and result in a mat that needles well.

The surfactant of the invention acts as a wetting agent, emulsifier and detergent to maintain the sizing as an emulsion and prevent build up of the solids on the applicator apparatus. Among suitable surfactants are condensates formed by condensing propylene oxide and propylene glycol such as those disclosed in U.S. Pat. No. 2,674,619. The preferred surfactants are those condensates having a molecular weight of about 1500 to 2000 and between 70 and 80 percent by weight of the poly(oxyethylene) in the molecule to successfully control foaming and aid in stabilizing the sizing emulsion. The surfactant is utilized in any amount that effectively maintains the emulsion and prevents build-up of solids on the applicator. A suitable amount is about 0.1 to about 5 percent by weight of the solids component of the sizing.

The softener may be utilized in any amount that softens the fiber for good needling. A suitable amount has been found to be between about 0.2 and about 1 percent by weight of the solids in sizing emulsion.

The sizing emulsion generally contains between about 99 percent and about 80 percent water. It is preferred in the use of a kiss roll applicator to have between about 92 and 96 parts by weight water in the sizing solution. Thus, solids amount is dependent on the applicator that is used to size the fiber strand.

The sized fiber forming packages and sized mat of the instant system may be utilized to reinforce any polymeric resin article. However, the instant fibers find greater functionality in the reinforcement of polyolefinic resin polymers such as polyethylene, 5-methylpentene and 2-methylpentene. A preferred polyolefinic polymer for utilization with the instant sized glass fiber strand is polypropylene since this polymer binds very well with the instant sizing, is relatively low cost and gives good strength properties when glass reinforced. The ratio of polypropylene to glass may be selected in any ratio that gives the desired properties to the finished article. Generally a ratio of about 10 to about 50 percent glass by weight is suitable. A preferred amount is about 30 to about 45 percent by weight glass in the molded article to give a good balance of cost properties and structural strength.

The amount of the sizings used on the glass may be any amount which results in good structural strength of the finished polyolefin fiber composite, good fiber integrity and handleability. A suitable amount of sizing is about 0.02 to about 1 percent by weight sizing solids to total weight of the sized strand of glass. A preferred range is about 0.6 percent to give good fiber integrity and handleability and binding with polypropylene.

The following Examples are preferred embodiments of the instant invention. The parts and percentages are by weight unless otherwise indicated.

EXAMPLE I

| Ingredient Functional Identification | Chemical Identification | Active Ingredient Parts by Weight |
|---|---|---|
| Coupling agent | gamma-aminopropyltriethoxy-silane Union Carbide A-1100) | 11 |
| Stabilizer | cis-butenedioic acid | 11 |
| Lubricant | emulsion of maleonated amorphous polypropylene 22% active 10% surfactant and KOH 68% water surfactant = alkoxylated phenol | 32 |
| Non-cross-linkable film former | vinylacetate homopolymer emulsion 54% solids (National Starch Resyn 25-1031) | 43 |
| Softener | polyethylenimene (Emerlube 6717 Emery Industries) | 3 |
| Surfactant | condensate of propylene oxide and propylene glycol (Pluronic F-68) BASF Wyandotte Corp. | .5 |

The above mixture is combined with deionized water to give an emulsion of about 4.5 parts solids.

The glass fiber strand sizing is prepared by adding most of the necessary deionized water to the mix tank and then slowly adding the lubricant and surfactant to the mix tank as it is agitated. The coupling agent is then added to the mix tank followed by adding the maleic acid with continued agitation. After the addition of the maleic acid, stirring is carried out for about 20 minutes to dissolve the acid. Then the non-crosslinkable film-forming material and softener is added to the tank. Additional necessary make-up water is added and the batch is checked to determine that the specifications are within the range of about a pH of 6 and a solids of about 4.5 parts per hundred.

In a preferred embodiment, the aqueous sizing mixture is applied to fiber filaments that are formed from a 400-hole bushing. The filaments are treated by a kiss roll applicator to coat about 0.6 percent solids by weight of the glass onto the filaments. The filaments are split into four strands and directly utilized to form, as in U.S. Pat. 3,883,333, a continuous fiber mat which is then needled. The needled mat is then dried via use of infrared heaters to flash-off residual moisture. The dried, needled mat is laminated with polypropylene polymer in the weight of about 60 parts by weight of polypropylene polymer to 40 parts by weight of the needled mat. The polyolefin resin and mat are combined via a temperature range of about 400° F. at a pressure of about 90 pounds per square inch for about 5 minutes to bond the reinforcing glass fibers to the polyolefin. The heating is carried out between stainless steel belts. The laminate of sized fiber matting and polypropylene is then stamped into a tub such as described at column 6 through 7 of U.S. Pat. No. 3,849,148 and tested for structural strength and structural modulus. The flexural strength was found to be about 23,000 pounds per square inch and the flexural modulus about $1 \times 10^6$ pounds per square inch. This example shows that the polypropylene reinforcing sized glass fiber strands of the instant invention provide satisfactory strong reinforced articles without the use of a peroxide or cross-linking resin.

EXAMPLE II

The method of Example I is repeated except the strands of fiber glass are wound to form forming packages that are dried at about 270° F. for 11 hours. The forming packages are used after three months of storage to form mat which is needled and combined with polypropylene polymer as in Example I. The flexural strength is found to be about the same as in Example I. This illustrates that the sizing of the invention provides a storage stable strand with good adhesion properties to polypropylene.

EXAMPLE III

The method of Example I is repeated except that 15 parts by weight N-beta(aminoethyl)gama-aminopropyl-trimethoxysilane (Union Carbide A-1120) is substituted for the silane of Example I. The sized fiber product displays good physical properties and successfully adheres to the polypropylene resins.

EXAMPLE IV

The method of Example I is repeated using the following composition sizing:

| Ingredient Functional Identification | Chemical Identification | Active Ingredient Parts by Weight |
|---|---|---|
| Coupling agent | gamma-aminopropyltriethoxy silane (Union Carbide A-1100) | 5 |
| Stabilizer | cis-butenedioic acid | 2.5 |
| Lubricant | emulsion of maleonated amorphous polypropylene 22% active 10% surfactant and KOH 68% water surfactant = alkoxylated phenol | 38 |
| non-cross-linkable film former | vinyacetate homopolymer emulsion 54% solids (National Starch Resyn 25-1031) | 50 |
| Softener | polyethylenimine polymer (Emerlube 6717 Emery Industries) | 4 |
| Surfactant | condensate of propylene oxide and propylene glycol (Pluronic F-68) BASF Wyandotte Corp. | .6 |

The above mixture is combined with deionized water to give an emulsion of about 4.5 parts solids.

The fibers made with the above sizing are utilized to produce good composite articles when combined as in Example I with polypropylene.

EXAMPLE V

The method Example I is repeated with the following sizing:

EXAMPLE V

The method Example I is repeated with the following sizing:

| Ingredient | | Active Ingredient |
|---|---|---|
| Functional Indentification | Chemical Identification | Parts by Weight |
| Coupling agent | amino-functional silane<br>H₂N(CH₂)₂N(CH₂)₂N(CH₂)₃Si(OCH₃)₃<br>(Union Carbide Y-5162) | 24 |
| Stabilizer | cis-butenedioic acid | 12 |
| Lubricant | emulsion of maleonated amorphous polyprpylene<br>22% active<br>10% surfactant and KOH<br>68% water<br>surfactant = alkoxylated phenol | 32 |
| Non-crosslinkable film former | vinylacetate homopolymer emulsion<br>54% solids<br>(National Starch Resyn 25-1031) | 34 |
| Softener | polyethylenimine<br>(Emerlube 6717 Emery Industries) | 2 |
| Surfactant | condensate of propylene oxide and propylene glycol<br>(Pluronic F-68)<br>BASF Wyandotte Corp. | .5 |

The above mixture is combined with deionized water to give an aqueous emulsion of about 4.5 parts solids, formed and tested as in Example I with successful results.

While the invention has been described with reference to several embodiments, those skilled in the art will recognize that variations may be made to the described methods and devices without departing from the substance of this invention. For instance, a pigment or dye could be added to the sizing solution without interference with its effect.

As will be apparent to those skilled in the art, the present system may be modified and equivalent elements or processes may be employed in combination therewith without departing from the spirit of the invention. For instance, an application device for the sizing could be utilized which would not require as large an amount of water in the sizing emulsion. Further, the fiber forming packages of the instant inventions may be utilized in the reinforcing of polymeric materials other than polyolefins. Also, a combination of the sized fiber forming packages of this invention could be utilized with fibers sized with a different material, with unsized fibers or with chopped fibers sized with the instant sizing.

Thus, the present disclosure of preferred embodiments is not intended to limit the scope of the applicant's invention.

I claim:

1. A storage stable glass fiber strand comprising a strand of glass impregnated with a storage stable sizing consisting essentially of a coupling agent, surfactant, softener, cis-butenedioic acid stabilizer, a modified polypropylene lubricant, and a non-crosslinkable vinyl acetate homopolymer film forming polymer.

2. The fiber of claim 1 wherein said coupling agent is selected from the group consisting of silanes and siloxanes.

3. The fiber of claim 1 wherein said coupling agent is an aminosilane.

4. The fiber of claim 1 wherein said lubricant comprises an emulsion of chemically modified polypropylene.

5. The fiber of claim 1 wherein said coupling agent comprises between about 2 and about 30 percent by weight of sizing, said stabilizer comprises between about 1 and about 15 percent by weight of said sizing, said lubricant comprises between 10 and about 50 percent by weight of said sizing, said non-crosslinkable polymer comprises between about 20 and about 60 percent by weight of said sizing, said softener comprises between about 0.2 and about 1 percent by weight of said sizing and said surfactant comprises between about 5 and about 0.1 percent by weight of said sizing.

6. The fiber of claim 1 wherein said coupling agent comprises between about 5 and about 12 percent by weight of sizing, said stabilizer comprises between about 2.5 and about 6 percent by weight of said sizing, said lubricant comprises between 10 and about 50 percent by weight of said sizing, said non-crosslinkable polymer comprises between about 35 and about 40 percent by weight of said sizing, said softener comprises between about 0.2 and about 1 percent by weight of said sizing and said surfactant comprises between 0.1 and about 5 percent by weight of said sizing.

7. The fiber of claim 1 wherein said softener is selected from the group consisting essentially of polyethylenimine derivatives.

8. The fiber of claim 1 wherein said surfactant is selected from the group consisting essentially of condensates of propylene oxide and propylene glycol.

9. An article comprising a polyolefin polymer reinforced with glass strands wherein said glass strands are impregnated with a storage stable sizing consisting essentially of a coupling agent, surfactant, softener, cis-butenedioic acid, stabilizer, modified polypropylene lubricant and a non-crosslinkable vinyl acetate homopolymer film forming polymer.

10. The article of claim 9 wherein said polyolefin is selected from the group consisting of polypropylene, polyethylene higher analogs and mixtures thereof.

11. The article of claim 9 wherein said coupling agent is selected from the group consisting of a silanes and siloxanes.

12. The article of claim 9 wherein said coupling agent is an aminosilane.

13. The article of claim 9 wherein said lubricant comrises an emulsion of chemically modified polypropylene.

14. The article of claim 9 wherein said coupling agent comprises between about 2 and about 30 percent of said sizing, said stabilizer comprises between about 1 and about 15 percent by weight of said sizing, said lubricant comprises between 10 and about 50 percent by weight said sizing, said non-crosslinkable polymer comprises between about 20 and about 60 percent by weight of said sizing, said softener comprises between about 0.2 and about 1 percent by weight of said sizing, said surfactant comprises between 5 and about 1 percent by weight of said sizing and said polyolefin polymer comprises between about 90 and about 50 percent of the total weight of said article.

15. The article of claim 9 wherein said coupling agent comprises between about 5 and about 12 percent by weight of said sizing, said stabilizer comprises between about 2.5 and about 5 percent by weight of said sizing, said non-crosslinkable polymer comprises between about 35 and about 40 percent by weight of said sizing and said polyolefin polymer comprises between about 70 and about 55 percent by weight of said article.

16. The article of claim 9 wherein said softener is selected from the group consisting essentially of polyethylenimine derivatives.

17. The article of claim 9 wherein said surfactant is selected from the group consisting essentially of condensates of propylene oxide and propylene glycol.

* * * * *

UNITED STATES PATENT AND TRADEMARK OFFICE
CERTIFICATE OF CORRECTION

PATENT NO. : 4,248,935

DATED : February 3, 1981

INVENTOR(S) : Chester S. Temple

It is certified that error appears in the above-identified patent and that said Letters Patent are hereby corrected as shown below:

Application No. --935,275-- was erroneously printed as "932,275"

on the cover page.

Signed and Sealed this

Twenty-fifth Day of August 1981

[SEAL]

Attest:

Attesting Officer

GERALD J. MOSSINGHOFF

Commissioner of Patents and Trademarks